(12) United States Patent
Nancarrow et al.

(10) Patent No.: US 9,376,263 B2
(45) Date of Patent: Jun. 28, 2016

(54) VIBRATION DETECTION SYSTEM, APPARATUS AND METHOD

(75) Inventors: Gregory Kenneth Nancarrow, Nedlands (AU); Timothy Francis Jones, Mount Hawthorn (AU)

(73) Assignee: Intium Energy Limited, West Perth (AU)

( * ) Notice: Subject to any disclaimer, the term of this patent is extended or adjusted under 35 U.S.C. 154(b) by 53 days.

(21) Appl. No.: 14/005,091

(22) PCT Filed: Mar. 14, 2012
(Under 37 CFR 1.47)

(86) PCT No.: PCT/AU2012/000263
§ 371 (c)(1),
(2), (4) Date: Apr. 28, 2014

(87) PCT Pub. No.: WO2012/122597
PCT Pub. Date: Sep. 20, 2012

(65) Prior Publication Data
US 2014/0343722 A1    Nov. 20, 2014

(30) Foreign Application Priority Data

Mar. 14, 2011  (AU) ................. 2011900904
May 5, 2011    (AU) ................. 2011901673
May 5, 2011    (AU) ................. 2011901674

(51) Int. Cl.
*G06F 7/00*    (2006.01)
*B65G 43/00*   (2006.01)
*B65G 43/02*   (2006.01)

(52) U.S. Cl.
CPC ............... *B65G 43/00* (2013.01); *B65G 43/02* (2013.01)

(58) Field of Classification Search
CPC ......... B65G 43/00; G01H 1/003; G01H 1/06; G01H 1/08; G01H 1/14; G01H 1/16
USPC ............ 700/230; 198/502.1, 810.01; 73/579, 73/651, DIG. 1
See application file for complete search history.

(56) References Cited

U.S. PATENT DOCUMENTS

| 6,116,089 A * | 9/2000 | El-Ibiary et al. ............... 73/593 |
| 7,673,739 B2 | 3/2010 | Freeman |
| 2003/0030565 A1* | 2/2003 | Sakatani et al. ............. 340/679 |
| 2009/0194390 A1 | 8/2009 | Freeman |
| 2011/0137587 A1* | 6/2011 | Rothlisberger et al. ......... 702/56 |

FOREIGN PATENT DOCUMENTS

WO    2010142029    12/2010

OTHER PUBLICATIONS

International Search Report for International Application No. PCT/AU2012/000263 dated May 9, 2012, (2 pages).

* cited by examiner

*Primary Examiner* — Mark Beauchaine
(74) *Attorney, Agent, or Firm* — Greenberg Traurig, LLP; David J. Dykeman; Roman Fayerberg

(57) ABSTRACT

A system for monitoring an endless belt conveyor, comprising a sensor for sensing a vibration of an idler roller and generating a signal corresponding to the sensed vibration, at least one of the frequency and amplitude of the generated signal being indicative of a condition of the idler roller, the sensor being integral with the endless belt conveyor.

14 Claims, 7 Drawing Sheets

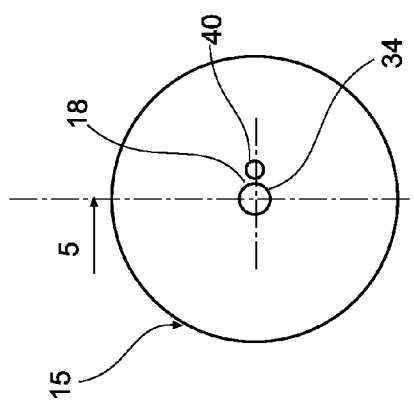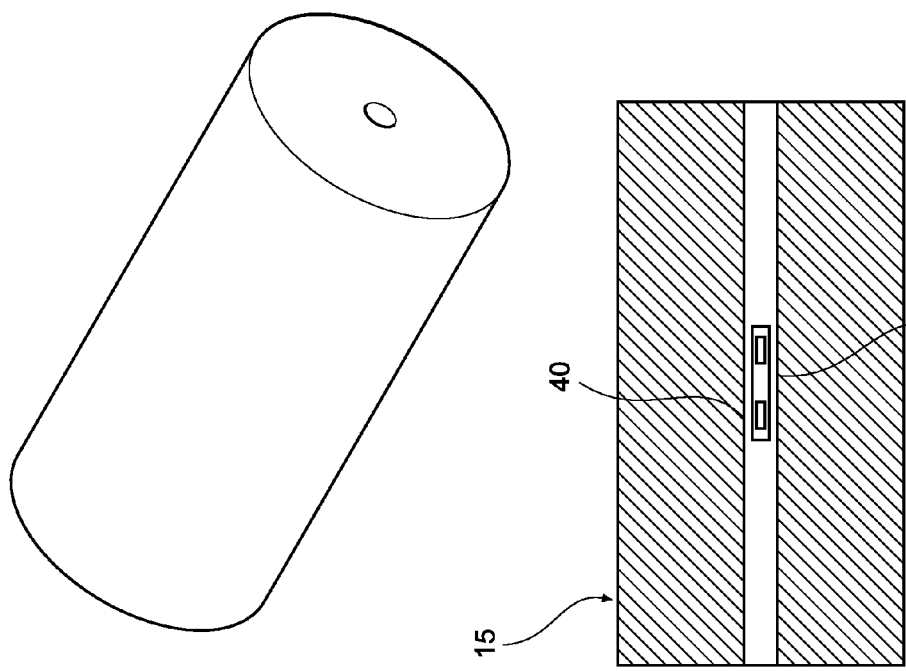

VIBRATION DETECTION SYSTEM, APPARATUS AND METHOD

RELATED APPLICATIONS

This application is a national phase filing under 35 U.S.C. 371 of International Application No. PCT/AU2012/000263, filed Mar. 14, 2012, which claims the benefit of and priority to Australian Application No. 2011900904, filed Mar. 14, 2011, Australian Application No. 2011901673, filed May 5, 2011 and Australian Application No. 2011901674, filed on May 5, 2011, all of these applications are incorporated herein by reference in their entireties.

TECHNICAL FIELD

This invention relates to a vibration detection system, apparatus and method. Embodiments of the invention find particular, but not exclusive, use in the vibration monitoring of idler rollers in endless belt conveyors.

BACKGROUND ART

The following discussion of the background art is intended to facilitate an understanding of the present invention only. The discussion is not an acknowledgement or admission that any of the material referred to is or was part of the common general knowledge as at the priority date of the application.

Endless belt conveyors are used in various applications, including transportation of bulk materials, such as ore, from one location to another.

Typically, an endless belt conveyor comprises an endless belt movable around end rollers and supported by intervening idler rollers. Each idler roller typically comprises a roller shell mounted on an axle by bearings accommodated in bearing housings incorporated in walls at the ends of the roller shell.

Idler roller failure may result in wear or damage to the conveyor belt, along with significant loss of production.

Bearing failure is a common cause of idler roller failure.

With a view to avoiding damage to the conveyor belt, it is desirable to conduct regular inspections of idler rollers to detect any deleterious change in their operating condition so that they can be repaired or replaced as necessary. However, such inspections can be difficult, particularly for conveyors which are extensive in length and which operate in noisy environments.

One common inspection regime involves having an operator travel alongside a conveyor and listen for sounds emanating from roller idlers having bearings that have either failed or are generating noise indicative of a deleterious change in condition.

This regime has not proved to be altogether satisfactory for various reasons, one being that it can be difficult to reliably identify which particular rollers might be generating the indicative noise. Further, such an inspection regime can be particularly time-consuming and often involve significant safety implications.

It is against this background that the present invention has been developed.

SUMMARY OF INVENTION

According to a first aspect of the invention there is provided a system for monitoring an endless belt conveyor comprising a sensor for sensing a vibration of an idler roller and generating a signal corresponding to the sensed vibration, at least one of the frequency and amplitude of the generated signal being indicative of a condition of the idler roller, the sensor being integral with the endless belt conveyor.

According to a second aspect of the invention there is provided a system for monitoring an endless belt conveyor comprising a sensor for sensing a vibration of an idler roller of the conveyor and generating a signal corresponding to the sensed vibration, and a controller for accumulating a plurality of signals generated by the sensor and emitting an output when the accumulation of signals exceeds a predetermined threshold level, the sensor being integral with at least one part of the endless belt conveyor.

In one arrangement, the sensor may be integral with the idler roller. With such an arrangement, the sensor may be accommodated within the confines of the idler roller and thereby be protected by the idler roller. This arrangement is advantageous as the idler roller could be supplied and fitted with the sensor in position, thereby avoiding any need for retrofitting of a sensor in circumstances where there is a change of idler roller within the conveyor.

In another arrangement, the sensor may be integral with a frame structure of the endless belt conveyor or a component thereof on which the roller is supported. This arrangement is advantageous in that mounting the sensor on the frame structure or component thereof provides a number of technical and commercial advantages. By way of example, having the sensor outside the idler roller would allow for a larger battery (and therefore longer battery life), would ameliorate data transmission difficulties (as internally located sensors would require an antenna to provide a signal of adequate strength). Moreover, having the sensor located outside the idler roller would allow the sensor to be retrofitted to existing conveyors and would also allow easier maintenance (e.g. changing batteries).

In an arrangement where the sensor is integral with the frame structure or a component thereof, the sensor may be directly mechanically coupled to the frame structure or a component thereof. This advantageously increases the quality of the signal acquired by the sensor.

In yet another arrangement, the sensor may be integral with the endless belt of the endless belt conveyor. With such an arrangement, the sensor would travel with the endless belt and periodically move into registration with the idler roller for sensing of vibration thereof. The sensor may be embedded into the endless belt. Alternatively, the sensor may be positioned on the endless belt at a location in which it would not hinder operation of the endless belt conveyor. Typically, the sensor would be positioned so as not to be exposed to damage from materials being conveyed by the endless belt, or alternatively be protected from any damage from such materials.

In one arrangement, there is further provided a controller which includes an energy store. Typically, the signal generated by the sensor comprises a voltage, and the energy store comprises an electrical power storage device. Preferably, the electrical power store includes a re-chargeable battery. The electrical power store may take any other appropriate form, such as a capacitor.

The output from the controller may be used to provide an indication of the condition of the idler roller based upon the vibration being sensed.

The output from the controller may be conveyed (either directly or indirectly) to a processor arranged to determine a condition of the idler roller based upon the frequency and/or amplitude of the outputs from the controller.

The output from the controller may be conveyed to the processor in any appropriate way, including wired transmission and wireless transmission. Where the output signal is conveyed by wireless transmission, an indirect form of the output may be conveyed. In other words, the output initiates transmission of a separate signal which is conveyed wirelessly to the processor. In one arrangement, the controller further comprises a transmitter for transmitting signal in response to the output. The transmitter may be a wireless transmitter.

The output may provide a voltage signal for actuating the transmitter. In other words the electrical power storage device includes a power supply for the transmitter, with the transmitter being actuated by the output in the form of voltage supplied from the electrical power storage device. This allows energy harvested from the idler roller to be used to power the transmitter. Specifically, mechanical energy harvested from the idler roller is used to generate electrical energy for powering the transmitter.

The processor may be arranged to monitor the frequency and/or amplitude of signals received from the transmitter and initiate an alarm in the event that the number of transmitted signals exceeds a predetermined allowable limit within a prescribed time interval. In circumstances where there is a deleterious change in the condition of the idler roller, there would be a corresponding increase in the frequency and/or amplitude of the output from the controller, thereby providing an indication of the change. The alarm may take any appropriate form, including a visual alarm, a tactile alarm, an audible alarm or any combination thereof.

In one arrangement, the processor is arranged to provide an indication if a signal is not received from the transmitter within a certain time period. The indication may also be of any appropriate form, including a visual indication, a tactile indication, an audible indication or any combination thereof. This arrangement is advantageous in that a routine check is provided to confirm that the system is functional and provide a warning if there is a malfunction.

The sensor may be a piezoelectric sensor. With such an arrangement, the piezoelectric sensor is operable to generate a voltage output signal corresponding to the vibration being sensed. With such an arrangement, the mechanical energy being harvested from the machine is in the form of vibrational energy.

Where the characteristic of the machine being monitored is vibration, the sensor may comprise a piezoelectric sensor configured to be responsive to vibration. Such a piezoelectric sensor may comprise a cantilever-type vibration sensor. The cantilever-type vibration sensor may comprise a beam having a mass adjacent one end thereof responsive to vibration.

According to a third aspect of the invention there is provided apparatus for installation on an endless belt conveyor, the apparatus comprising a sensor, and an electrical power storage device, the sensor being adapted to sense a characteristic of the endless belt conveyor machine and to generate a signal corresponding to the sensed characteristic.

In one arrangement, the sensed characteristic is vibration of an idler roller forming part of the endless belt conveyor.

In one arrangement, the sensor generates electrical energy in response to the sensed characteristic, the generated electrical energy being transferred to the electrical power storage device.

The apparatus may further comprise a transmitter adapted to be powered by the electrical power storage device.

In one arrangement, the transmitter is a wireless transmitter.

According to a fourth aspect of the invention there is provided a system for monitoring a machine comprising a sensor for sensing a characteristic of the machine and generating a signal corresponding to the sensed characteristic, a monitoring system for determining a condition of the machine based upon the signal or an accumulation of signals generated by the sensor, the monitoring system being operable to provide an output upon the signal or the accumulation of signals exceeding a predetermined threshold level.

According to a fifth aspect of the invention there is provided a system for monitoring a machine comprising a sensor for sensing a characteristic of the machine and generating a signal corresponding to the sensed characteristic, and a monitoring system for determining a condition of the machine based upon the frequency and/or amplitude of the signal.

According to a sixth aspect of the invention there is provided a system for monitoring an endless belt conveyor comprising a sensor for sensing a vibration of an idler roller of the conveyor and generating a signal corresponding to the sensed vibration, and a controller for accumulating a plurality of signals generated by the sensor and emitting an output when the accumulation of signals exceeds a predetermined threshold level, the sensor being configured as part of apparatus comprising the sensor, an electrical power storage device and a wireless transmitter, the apparatus being integral with the endless belt conveyor.

According to a seventh aspect of the invention there is provided an endless conveyor system having a system according to the first, second or fourth aspect of the invention.

According to an eighth aspect of the invention there is provided a system for Monitoring an endless belt conveyor comprising a sensor for sensing a vibration of an idler roller of the conveyor and generating a signal corresponding to the sensed vibration, and a monitoring system for determining a condition of the idler roller based upon the frequency and/or amplitude of the signal.

In one arrangement, the sensor is coupled to the idler roller to respond to vibrations thereof. In one arrangement, the sensor may be coupled directly to the idler roller, such as being coupled to an end wall, a bearing of the idler roller or an external shaft of the idler roller.

In another arrangement, the sensor may be coupled indirectly to the idler roller, such as by being mounted on a frame structure configured to support the idler roller.

The sensor may be mounted in position to respond to the characteristic being sensed in any suitable way. The sensor may, for example, be accommodated in a casing adapted to be attached in position by mechanical fastening, adhesive bonding or magnetic attachment.

According to a ninth aspect of the invention there is provided a method of a monitoring a machine comprising: sensing a characteristic of the machine; generating a signal corresponding to the sensed characteristic; accumulating a plurality of signals so generated; and emitting an output when the accumulation of signals exceeds a predetermined threshold level.

According to a tenth aspect of the invention there is provided a method of monitoring an endless belt conveyor comprising: sensing vibration of an idler roller of the endless belt conveyor; generating a signal corresponding to the sensed vibration; accumulating a plurality of signals so generated; and emitting an output when the accumulation of signals exceeds a predetermined threshold level.

According to an eleventh aspect of the invention there is provided an endless belt conveyor monitor using a method according to the tenth aspect of the invention.

According to a twelfth aspect of the invention there is provided a frame structure or component thereof for an endless belt conveyor, the frame structure or component thereof incorporating a system according to any one of the first, second or fourth aspects of the invention.

According to a thirteenth aspect of the invention there is provided a frame structure or component thereof for an endless belt conveyor according to the fourth or sixth aspect of the invention.

According to a fourteenth aspect of the invention there is provided a system for monitoring an endless belt conveyor comprising a sensor for sensing a vibration of an idler roller of the conveyor and generating a signal corresponding to the sensed vibration, and a monitor for determining a condition of the idler roller based upon the frequency and/or amplitude of the signal, the sensor being integral with the endless belt conveyor.

BRIEF DESCRIPTION OF THE DRAWINGS

The invention will be better understood by reference to the following description of several specific embodiments thereof as shown in the accompanying drawings in which:

FIG. 4 is an end view of the idler roller of FIG. 3;

FIG. 5 is a section along line 5-5 of FIG. 4;

DESCRIPTION OF EMBODIMENTS

A first embodiment, which is shown in FIGS. 1 to 8 of the drawings, is directed to a monitoring system 10 according to the first embodiment for monitoring an endless belt conveyor 11.

The endless belt conveyor 11 comprises an endless belt 13 movable about head and tail rollers (not shown) and supported by intervening idler rollers 15. Typically, the endless belt 13 has an upper load-carrying run and a lower return run, with each run being supported by respective idler rollers 15.

Figure 1:
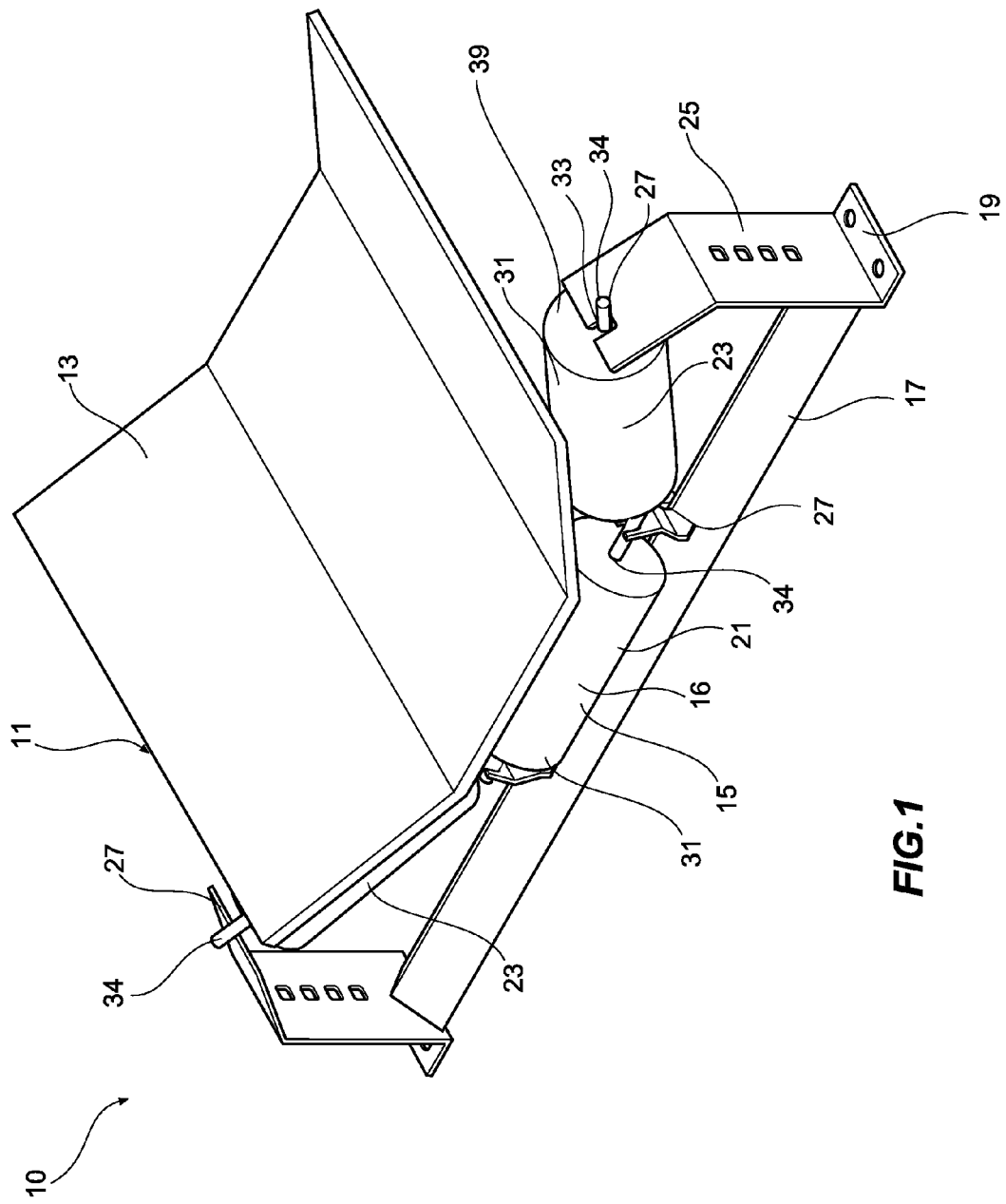
FIG. 1 is a fragmentary perspective view of an endless belt conveyor fitted with a monitoring system according to one embodiment.
Figure 2:
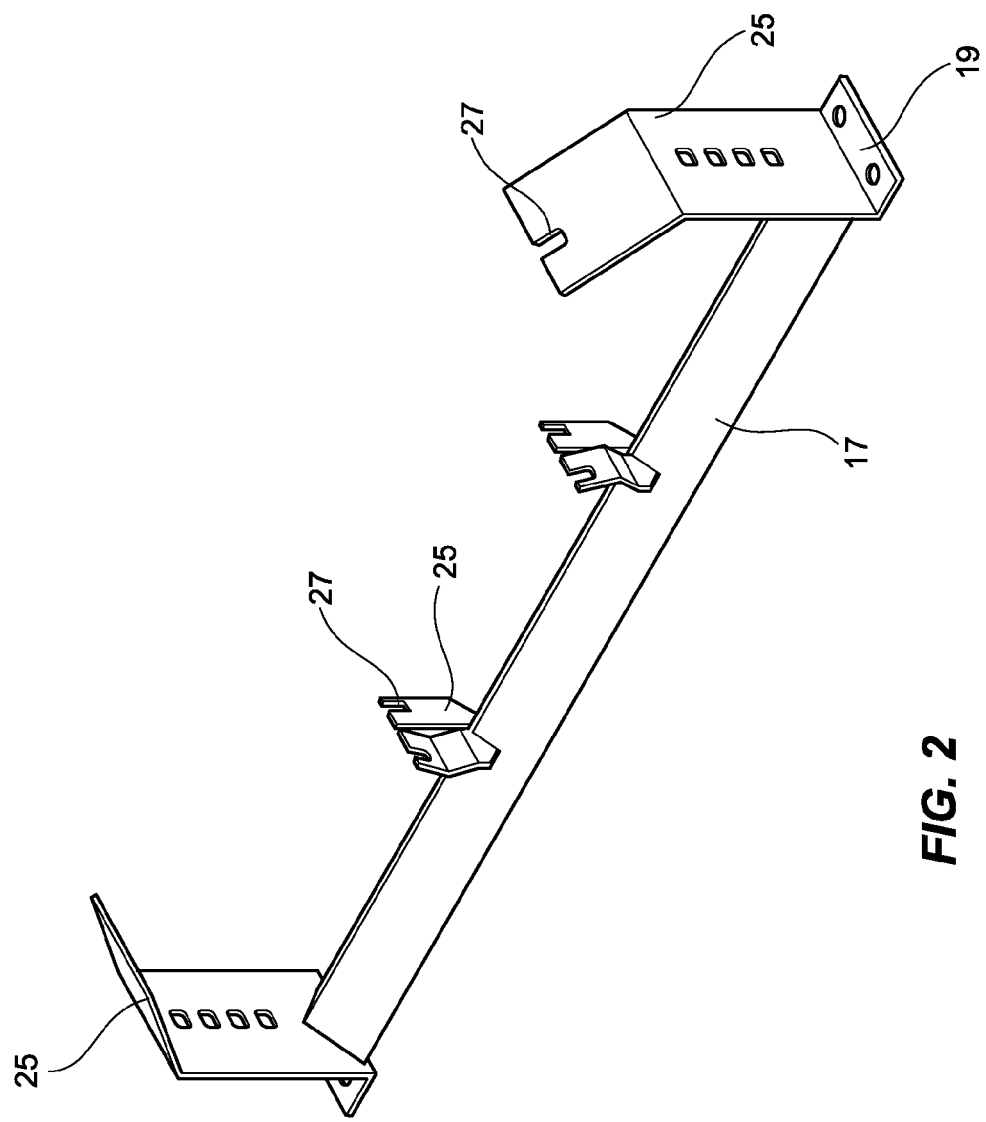
FIG. 2 is a perspective view of a, frame structure forming part of the endless belt conveyor of FIG. 1.
Figure 3:
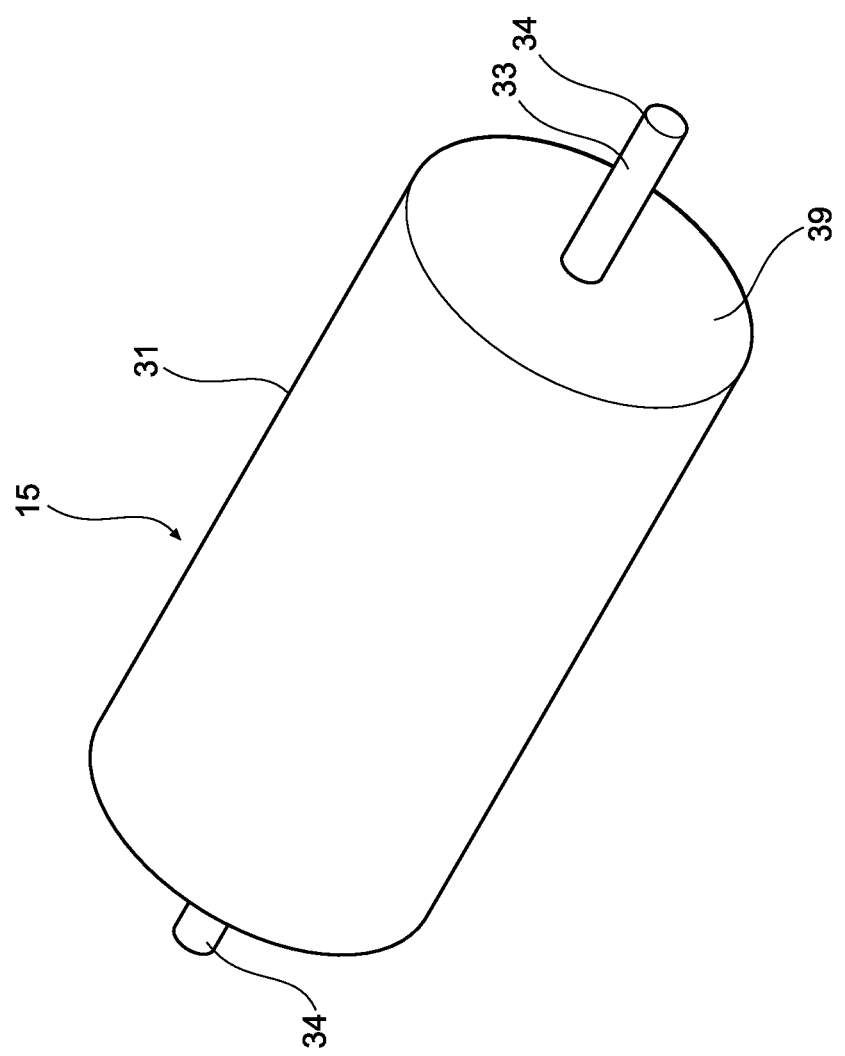
FIG. 3 is a schematic perspective view of an idler roller for the endless belt conveyor of FIG. 1.

The idler rollers 15 are supported in roller sets 16 on a frame structure 17 which typically comprises a plurality of frame sections 19 connected one to another. FIG. 1 shows part of one frame section 19 and idler rollers 15 for supporting the upper run of the endless belt. In the arrangement shown, the idler roller set 16 is in a trough configuration comprising a central roller 21 and two lateral rollers 23.

The frame structure 17 includes upstanding mounts 25 configured as cradles 27 for receiving and supporting the idler rollers 15 in known manner.

Each idler roller 15 comprises a roller shell 31 mounted on an axle 33 by bearings (not shown) accommodated in bearing housings (not shown) incorporated in walls 39 at the end of the roller shell 31. The axle 33 has projecting opposed end portions 34 adapted to be received and retained in the cradles 27.

The system 10 is configured to monitor the vibration characteristics of the idler rollers 15 in each roller set 16.

Vibration is a characteristic of an idler roller which is indicative of the operating condition of the bearings in the roller. When the bearings are in good operating condition there is a relatively small amount of vibration of the idler roller. As the bearing wears, the level of vibration of the idler roller progressively increases. Accordingly, the extent of vibration of the idler roller is indicative of the condition of the bearings upon which the idler roller is rotating.

In this embodiment, the system 10 is adapted to monitor the vibration characteristics of each idler roller 15 and initiate a warning signal in the event that the vibration exceeds a predetermined level deemed to be acceptable. If any one or more of the idler rollers 15 in the idler roller set 16 experiences a deleterious change in its operating condition, the resultant vibration is transmitted to the frame structure 17 for detection by the monitoring system 10. The system 10 monitors each idler roller set 16 individually through the frame structure 17 and issues a warning signal related specifically to any idler roller set which has undergone a deleterious change so as to no longer operate at a vibration level with the acceptable limit. Other arrangements are, of course, possible. By way of example, each idler roller 15 could be monitored individually.

The monitoring system 10 comprises apparatus 40 associated with each idler roller 15 to be monitored. The apparatus 40 comprises a package 41 incorporating componentry 43 in a casing. The package 41 is shown schematically in FIG. 6. The componentry 43 includes a sensor 47 and a controller 49.

The controller 49 includes a wireless transmitter 51 having an antenna 52.

The controller 49 further includes a micro-controller 53, a signal processing circuit 55, and a power control circuit 57 incorporating a re-chargeable battery (not shown).

Figure 7:
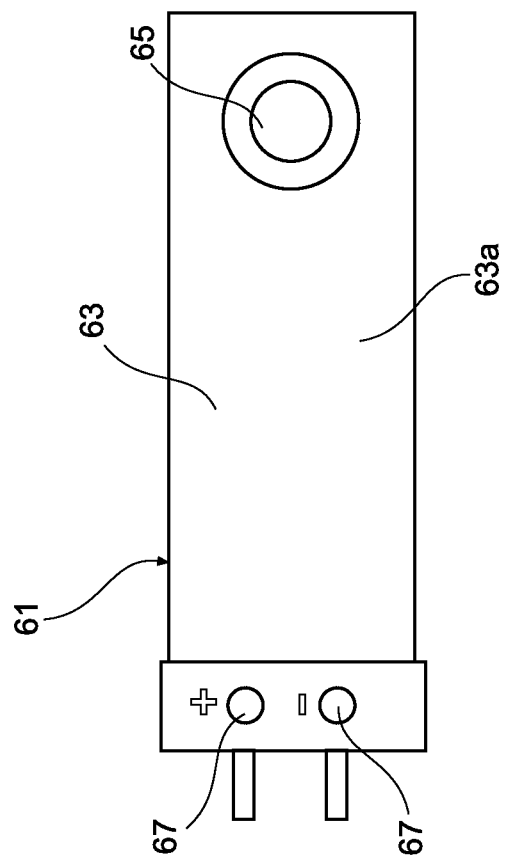
FIG. 7 is a schematic side view of a piezoelectric sensor incorporated in the apparatus shown in FIG. 6.
Figure 8:
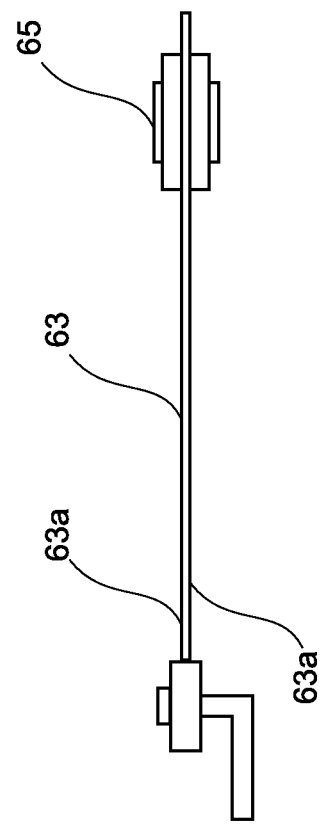
FIG. 8 is a schematic plan view of a piezoelectric sensor.

The sensor 47 comprises a vibration sensor 61 configured as a piezoelectric sensor operable to generate a voltage output signal corresponding to the sensed vibration. The piezoelectric sensor 61 comprises a cantilever-type vibration sensor (as shown in FIGS. 7 and 8) comprising a beam 63 with longitudinal sides 63a having a mass 65 adjacent one end thereof responsive to vibration. The piezoelectric sensor 61 has two output electrodes 67 across which a voltage signal is generated in response to vibratory movement of the beam 63.

The voltage signals received from the piezoelectric sensor 61 are received by the controller 49 and used to charge the battery (not shown) incorporated in the power control circuit 57. When the battery (not shown) reaches a predetermined charge level, the controller 49 outputs a signal to the wireless transmitter 51 to cause the transmitter to transmit a signal. In this embodiment, the signal outputted by the controller 49 to the transmitter 51 comprises a voltage for actuating the transmitter 51. In other words, the power control circuit 57 incorporating the re-chargeable battery (not shown) constitutes a power supply for the transmitter 51, with the transmitter being actuated by the output in the form of voltage supplied from the power control circuit 57.

In this manner, energy harvested from the vibration of the sensor 61 is utilised to power and operate the sensor system. In an alternate embodiment, it will be understood that energy may also be harvested by alternate arrangements. For example, in one embodiment (not shown), there the sensor may be powered by magnetic induction. In such an embodiment, the magnetic induction may be achieved by incorporating a plurality of magnets into the conveyor frame, such that the movement (spinning or otherwise) of the circular sensor past each magnet mounted on the frame induces a voltage and/or current in the sensor, in a manner analogous to the vibratory example described above.

It will be evident that one of the advantages of the system using a piezoelectric sensor as described is that it does not require a local power source, such as batteries, or a reticulated power source, such as mains electricity to function. As such, problems associated with errors in maintenance and inadequate or unpredictable power supplies can be alleviated. Furthermore, the problem of installation and ongoing maintenance costs are significantly minimized by the way in which the system can derive its power source from either the ambient conditions or from waste energy available from the source being monitored or measured. Still further, the system has potentially fewer limitations on the size and potential location of different monitoring or measurement systems that may be employed. As such the system may permit installation to remote or difficult to access areas of equipment parts whilst not requiring an external power source for its operation.

It will be understood however, that in an alternative embodiment, the system may be powered by a local power source, such as a battery or other power source (e.g. a capacitor). That is, there may be no energy harvesting mechanism or there may be a combination of an energy harvesting mechanism and a local power source (such as a conventional electric power connection), such that the system can switch from a harvested power source to a local power source as required. Such an embodiment may find use in situations where the sensor is not capable of generating enough of an electrical signal and may need assistance through amplification.

Alternatively, where the system does not utilise a piezoelectric sensor and does not 'generate' any electrical signal or voltage/current, a conventional power source is utilised to provide power to the sensor so that an appropriate signal may be generated. Such variations are within the purview of a person skilled in the art. Moreover, it will be further understood that while the embodiment described herein refers to use a piezoelectric sensor and to the detection of vibration (i.e. mechanical movement), the system may utilise any suitable sensor or combination of sensors, arranged to sense any suitable parameter or parameters, including but not limited to motion sensors that detect motion indirectly (e.g. infra-red or other 'visual' sensors), thermal sensors that detect changes in temperature (as a rise in temperature is linked to wear and friction), audio sensors (arranged to detect changes in the noise produced by a roller), or any other sensor that is capable of capturing information relevant to a physical parameter that is linked to the condition of the roller. Such variations are also within the purview of a person skilled in the art.

Correspondingly, as different types of sensors may be utilised (either singly or in combination), the signal sent by the senor or sensors (and consequently the information or data collected from the sensors) may also vary. The signal may be provided in the form of an analogue or digital signal, and the signal and/or information or data derived from the signal may be collated and stored in any suitable manner.

Returning to the monitoring system 10, there is further provided a processor (not shown) adapted to receive signals transmitted by the transmitter 51. The processor (not shown) is arranged to monitor the frequency and/or amplitude of signals received from the transmitter 51 and initiate an alarm in the event that the number of transmitted signals exceeds a predetermined allowable limit within a prescribed period of time. The circumstance where that the number of transmitted signals exceeds a predetermined allowable limit within a prescribed period of time is indicative of a deleterious change in the operation of the respective idler roller; that is, where there is a deleterious change in the condition of the idler, there would be a corresponding increase in the frequency and/or amplitude of signals transmitted by the transmitter 51.

In this embodiment, the processor is also arranged to provide an indication if a signal is not received from the transmitter 51 within a prescribed time period. This arrangement is advantageous in that it provided a routine check to confirm that the system is functional and provide a warning if there is a malfunction.

It will be understood that while the preceding description refers to the frequency and/or amplitude of the signal being utilised to determine whether an alarm is initiated, any other suitable characteristic of the signal may be utilised. For example, the shape of the signal, the analysis of components of the signal (such as determining points of inflection or discontinuities) or any other artefact of the signal can be used to determine whether an alarm should be initiated.

Moreover, while the preceding description refers to the alarm being dependent on a predetermined allowable limit or threshold being reached, the method for determining whether an alarm should be initiated is dependent on the signal received (and on the data or information derived from the signal), so it will be understood that any appropriate trigger condition may be utilised as the basis for initiating an alarm. In one example, a number of criteria may need to be met to initiate an alarm. The number of criteria may include deriving information regarding a number of artefacts or characteristics of the signal, including but not limited to frequency, amplitude, analysis of components of the signal, or any other information or data that can be derived from the signal.

The indication may also be of any appropriate form, including a visual indication, a tactile indication, an audible indication or any combination thereof. An advantage of the system is the way in which it can be configured to automatically flag warnings without operator intervention being required. Hence, it may allow more cost effective maintenance solutions with lesser reliance on staff checking components by hand and reduced downtime of key equipment.

The processor may be positioned at any appropriate location. In one arrangement, the processor may be positioned in a central control station. Such an arrangement would be particularly suitable in circumstances where there is a common unit arranged to receive and monitor signals transmitted by a plurality of transmitters 51. In another arrangement, the processor may be positioned on the endless conveyor. In yet another arrangement, the processor may be configured as a mobile arrangement adapted to move with respect to the endless belt conveyor and sequentially register with the various transmitters 51 to received transmitted signals therefrom. The mobile arrangement may take any appropriate form such as, for example, a unit adapted to travel along the conveyer, or a unit adapted to be carried or otherwise transported along the conveyor by an operator.

In this embodiment, the apparatus 40 is integral with each idler roller 15, as shown in FIG. 5. Specifically, each idler roller 15 has apparatus 40 accommodated within the confines of the idler roller and thereby be protected by the idler roller. This may provide a sealed environment for the apparatus 40 and isolate it from moisture, dust, dirt and other contaminant matter in the environment about the conveyor 11. In the arrangement shown, each idler roller 15 has an internal cavity 18 in which the respective apparatus 40 is accommodated and thereby contained within the confines of the idler roller.

This arrangement is advantageous as the idler roller. 15 could be supplied and fitted with the apparatus 40 in position, thereby avoiding any need for retrofitting of apparatus 40 in circumstances where there is a change of idler roller within the conveyor 11.

The apparatus 40 is oriented so that the longitudinal extent of the beam 63 of the piezoelectric sensor 61 is substantially parallel to the axis of rotation of the roller to enhance responsiveness to vibration. Further, the longitudinal sides 63a of the beam 63 are so oriented in order to optimise responsiveness to vibration.

Typically, the system 10 is calibrated so that the piezoelectric sensor 61 is responsive to vibrations of the idler roller 15. The sensor 61 is also configured to discriminate against extraneous vibrations, such as ambient vibrations generated through operation of the endless belt conveyor generally, including the travelling motion of the endless belt 13 and vibrations arising from materials carried on the endless belt.

Figure 9:
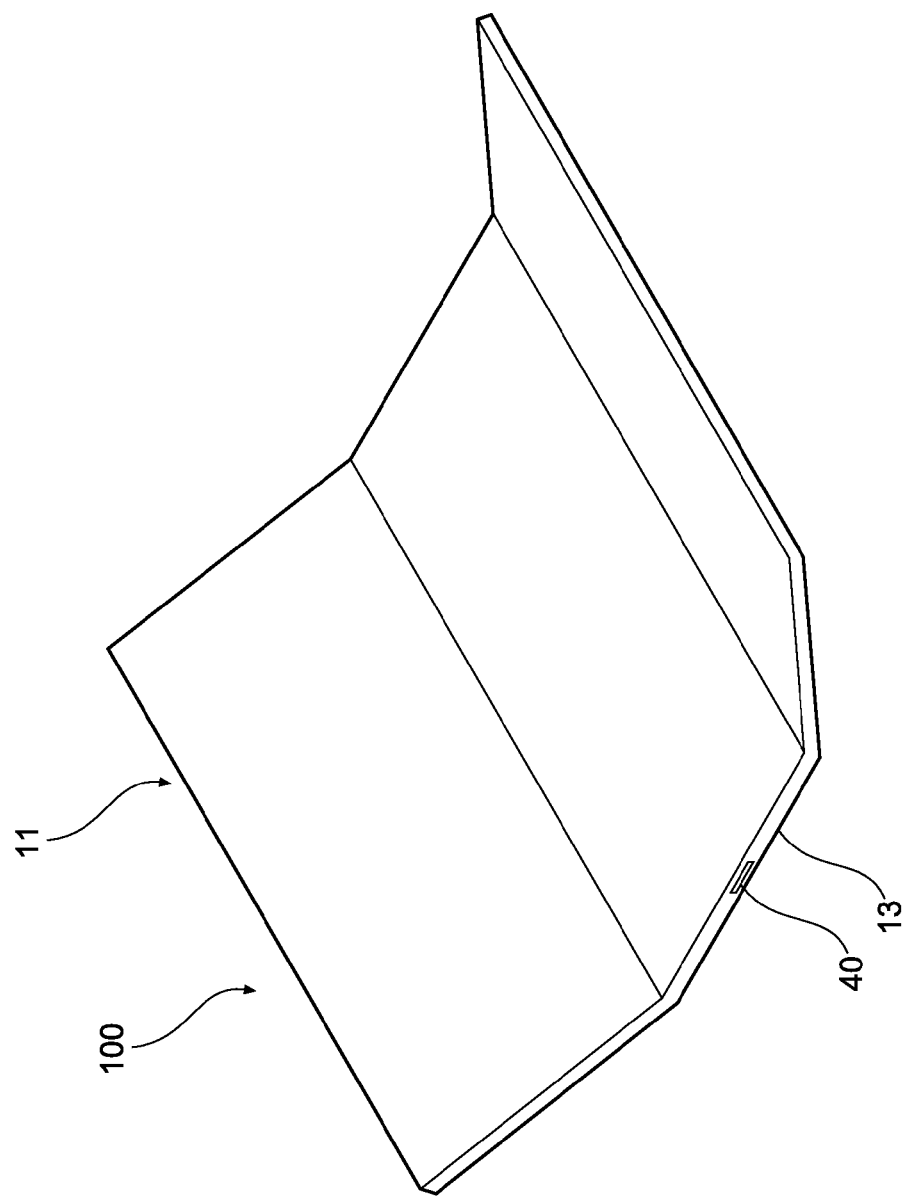
FIG. 9 is a fragmentary perspective view of an endless belt conveyor fitted with a monitoring system according to another embodiment.

Referring now to FIG. 9, there is shown a conveyor belt 13 fitted with a monitoring system 100 according to the second embodiment. The monitoring system 100 according to the second embodiment is similar in many respects to the monitoring system 10 according to the previously described embodiment and so like reference numerals are used to identify parts which serve equivalent functions.

In the embodiment described with reference to FIG. 9, the system 100 is configured to monitor each idler roller 15 individually. In other words, there is a dedicated apparatus 40 associated with each idler roller to be monitored. The sensor 47 may be coupled directly to the idler roller 15, such as by being mounted on an end wall or bearing of the idler roller. In the arrangement shown, apparatus 40 is mounted on the end wall 39 of the endless belt conveyor 11 with the piezoelectric sensor 61 being coupled to the adjacent bearing. In another arrangement, the apparatus 40 would travel with the endless belt 11 and periodically move into registration with the idler rollers 15 for sensing of vibration thereof.

This arrangement is advantageous as the endless belt 11 can be supplied in lengths of belt material, with each length having apparatus 40 incorporated therein at appropriate locations.

Figure 6:
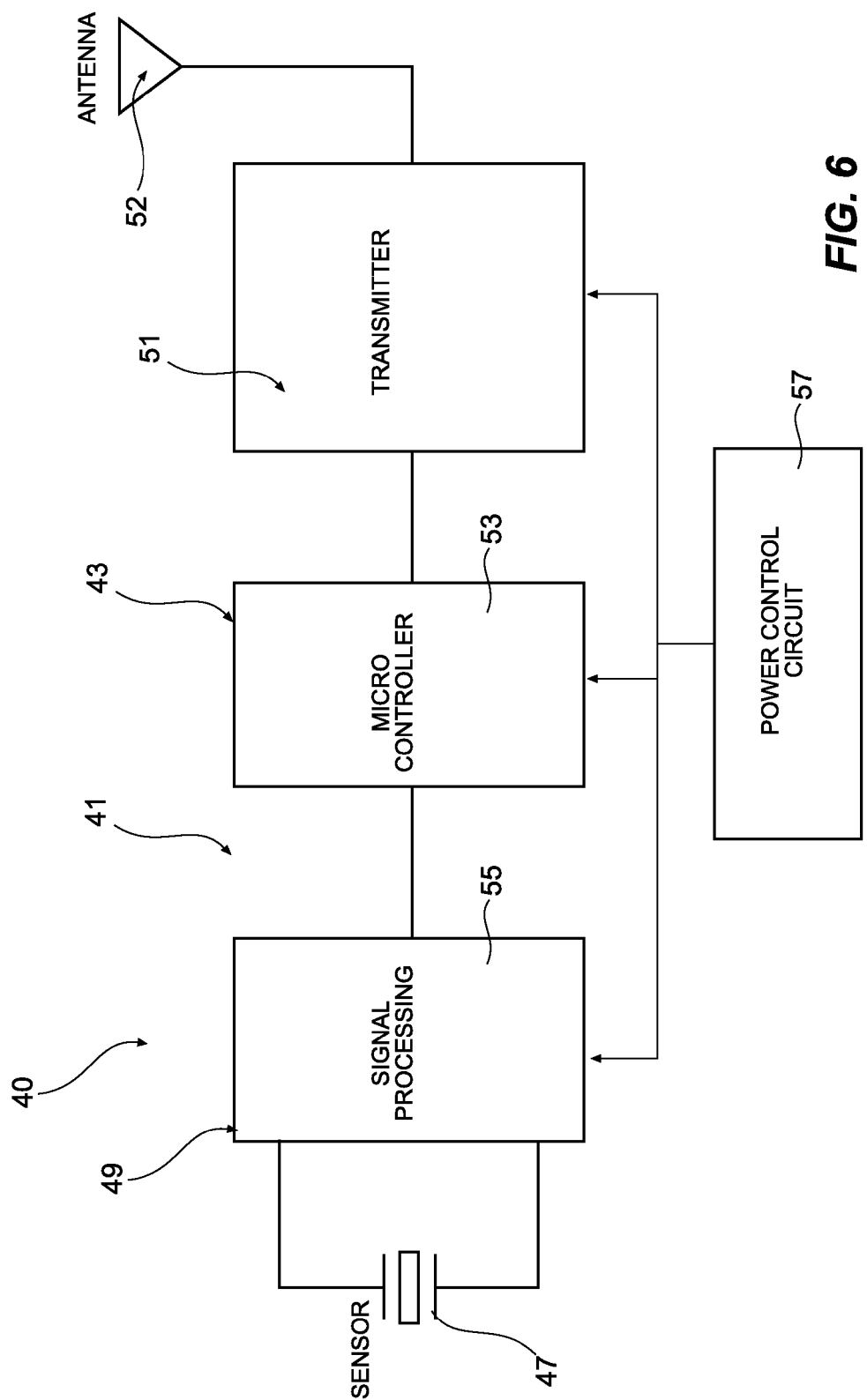
FIG. 6 is a schematic view of apparatus forming part of the monitoring system according to one embodiment.

Rather than the sensor 47 being embedded into the endless belt 13, the sensor may be coupled indirectly to the idler roller, such as by being mounted on the frame section 19 inclose proximity to the idler roller concerned. In FIG. 6, only the central roller 21 is shown fitted with the apparatus 40 may alternatively be positioned on the endless belt 13 at a location in which it would not hinder operation of the endless belt conveyor. By way of example, the apparatus 40 may be positioned on the underside of the endless belt 13 so as to travel along a path which passes between the various idler rollers 15. Typically the two lateral idler rollers 23 would be positioned so as not to be exposed to damage from materials being conveyed by the endless belt, or alternatively would be protected from any damage from such materials.

In yet another embodiment, which is not shown in the Figures, the apparatus 40 may be incorporated in the frame structure 17; specifically within the frame element 19. Preferably, the apparatus would be integral with the frame element 19 and accommodated in a protected position within its confines. With such an arrangement, the system would monitor the respective idler roller set 16 through the frame element 19. If any one or more of the idler rollers 15 in the idler roller set 16 experiences a deleterious change in its operating condition, the resultant vibration is transmitted the frame element 19 for detection by the sensor. This will provide an indication that one of the idler rollers 15 in the idler roller set has suffered a deleterious change in its operating condition, although it will not necessarily identify the particular idler roller which is defective.

This arrangement is advantageous as the frame element 19 could be supplied and installed with the apparatus 40 in position, thereby avoiding any need for retrofitting of apparatus 40.

In a variation to this embodiment, the frame element 19 may incorporate a respective apparatus 40 corresponding to each idler roller 15 supported by the frame element. With this arrangement, the sensor 47 of each apparatus 40 would typically be positioned in close proximity to the respective idler roller and calibrated to be responsive to vibrations thereof while discriminating against vibrations from the other idler roller supported on the frame element and also ambient vibrations.

The transmitters 51 incorporated in the apparatus 40 may communicate with a common processor (not shown), or alternatively there may be a separate processor associated with each transmitter.

From the foregoing, it is evident that the present embodiments each provides a simple yet highly effective system for monitoring the operating condition of idlers roller in an endless belt conveyor. The system seeks to allow idler rollers which have undergone a deleterious change in their operating condition to be identified before the roller bearings fail and cause damage to the endless belt and a consequent unscheduled stoppage in the operation of the endless belt conveyor.

The monitoring system according to each embodiment facilitates a predictive maintenance strategy to avoid production losses through unscheduled stoppages of the endless belt conveyor.

It should be appreciated that the scope of the invention is not limited to the scope of the embodiments described.

In the embodiments described, the processor (not shown) is adapted to monitor the frequency of signals received from the transmitter 51 and initiate an alarm in the event that the number of transmitted. In another embodiment, the processor is adapted to monitor the amplitude of signals received from the transmitter 51 and initiate an alarm in response to the presence of a certain amplitude or amplitude range. In yet another embodiment, the processor is arranged to monitor both the frequency and the amplitude of signals received from the transmitter 51.

In yet another embodiment, a parameter of the signal generated by the sensor may be indicative of the condition of the idler roller. In other words, rather than the frequency at which the signals are generated being representative of the condition of the idler roller, a parameter(s) of the signal itself is representative of the monitored condition. The parameter(s) of the signal may be of any appropriate form, such as for example the signal amplitude, the signal frequency or a combination thereof.

It will be understood that while specific embodiments described herein reference a single sensor arranged to serve a dual purpose, namely to provide a signal indicative of wear and to harvest energy, other embodiments utilise a plurality of sensors arranged to each provide a different function. That is, in one specific embodiment, a first sensor operates to provide a signal indicative of wear, whereas a second sensor is utilised only for the purpose of harvesting energy. In another specific embodiment, there may be provided a plurality of sensors which are all capable of both harvesting energy and/or providing a signal. In such an embodiment, the controller may be capable of switching the function of each of the sensors as required.

In other words, embodiments which utilise multiple sensors in a dynamic manner fall within the broad inventive concept described herein.

While the embodiments have been directed to monitoring of idler rollers in an endless belt conveyor, it should be understood that the invention may have application in monitoring any rotating machine, device or element.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. A system for monitoring an endless belt conveyor comprising a sensor for sensing a vibration of an idler roller of the conveyor and generating a signal corresponding to the sensed vibration; an electrical power storage device; and a controller for accumulating a plurality of signals generated by the sensor and emitting an output when the accumulation of signals exceeds a predetermined threshold level, wherein the sensor is directly mechanically coupled to a frame structure of the endless belt conveyor, wherein the controller provides an output arranged to provide an indication of the condition of the idler roller based upon the vibration being sensed, the output from the controller being provided to a processor arranged to determine a condition of the idler roller based upon the frequency and/or amplitude of the output from the controller, the output from the controller being provided to the processor via a transmitter, and wherein the processor is arranged to provide an indication if a signal is not received from the transmitter within a defined time period.

2. The system in accordance with claim 1, wherein the signal generated by the sensor comprises a voltage.

3. The system in accordance with claim 1, wherein the sensor is a piezoelectric sensor.

4. The system in accordance with claim 1, wherein the sensor is directly mechanically coupled to a frame structure of the endless belt conveyor separately from the idler roller.

5. The system in accordance with claim 1, wherein the output from the controller is provided to the processor via wireless transmission.

6. The system in accordance with claim 5, wherein the controller further comprises the transmitter for transmitting a signal in response to the output.

7. The system in accordance with claim 6, wherein the output provides a voltage signal arranged to actuate the transmitter.

8. The system in accordance with claim 6, wherein mechanical energy harvested from the idler roller is used to generate electrical energy for powering the transmitter.

9. The system in accordance with claim 1, wherein the processor is arranged to monitor the frequency and/or amplitude of signals received from the transmitter and initiate an alarm in the event that the number of transmitted signals exceeds a predetermined allowable limit.

10. The system in accordance with claim 9, wherein the alarm includes at least one of a visual alarm, a tactile alarm and an audible alarm.

11. An endless belt conveyor comprising a sensor for sensing a vibration of an idler roller of the conveyor and generating a signal corresponding to the sensed vibration; controller for accumulating a plurality of signals generated by the sensor and emitting an output when the accumulation of signals exceeds a predetermined threshold level; and an electrical storage device, wherein the controller provides an output arranged to provide an indication of the condition of the idler roller based upon the vibration being sensed, the output from the controller being provided to a processor arranged to determine a condition of the idler roller based upon the frequency and/or amplitude of the output from the controller, the output from the controller being provided to the processor via a transmitter, and wherein the processor is arranged to provide an indication if a signal is not received from the transmitter within a defined time period.

12. The system in accordance with claim 11, wherein the sensor is directly mechanically coupled to a frame structure of the endless belt conveyor separately from the idler roller.

13. A method of a monitoring an endless belt conveyor comprising sensing vibration of an idler roller of the endless belt conveyor utilising a sensor directly mechanically coupled to a frame structure of the conveyor; generating a signal corresponding to the sensed vibration; accumulating a plurality of signals so generated; and emitting an output from a transmitter to a processor when the accumulation of signals exceeds a predetermined threshold level, the output providing an indication of the condition of the idler roller based upon the vibration being sensed, the processor determining a condition of the idler roller based upon the frequency and/or amplitude of the output from the controller, and the processor providing an indication if a signal is not received from the transmitter within a defined time period.

14. The system in accordance with claim 13, wherein the sensor is directly mechanically coupled to a frame structure of the endless belt conveyor separately from the idler roller.

* * * * *